Feb. 5, 1924.
LE ROY BRAISTED
1,482,541
WELDED COLUMN AND PROCESS OF MAKING IT
Filed Aug. 14, 1922
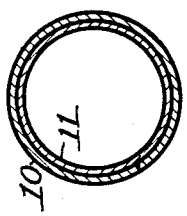
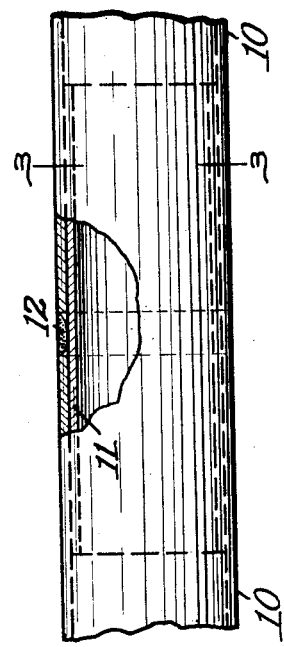
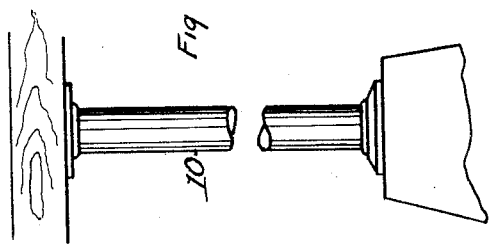
INVENTOR Patented Feb. 5, 1924.

1,482,541

UNITED STATES PATENT OFFICE.

LE ROY BRAISTED, OF WELLESLEY, MASSACHUSETTS, ASSIGNOR TO MILFORD IRON FOUNDRY, OF MILFORD, MASSACHUSETTS.

WELDED COLUMN AND PROCESS OF MAKING IT.

Application filed August 14, 1922. Serial No. 581,606.

*To all whom it may concern:*

Be it known that I, LE ROY BRAISTED, a citizen of the United States, residing at Wellesley, in the county of Norfolk and State of Massachusetts, have invented new and useful Welded Columns and Processes of Making Them, of which the following is a specification.

This invention relates to a column or pipe formed of two pieces of piping or tubing welded together.

The principal object of this invention is to provide a practical and efficient means for utilizing the ends of pipes and tubes that have to be cut off in various industries but particularly in the making of columns. The piping which is manufactured in the right sizes for use for concrete filled columns is made 18' long. The columns are usually 10 or 12 feet long and the balance has to be cut off and is wasted usually. This percentage of waste is very great obviously and attempts have been made heretofore to eliminate it, or at least reduce it materially, by the welding of otherwise wasted short ends of pipe end to end. This has not been successful for the reason that not only is the weld necessarily visible but it leaves a weak zone around the pipe or column which will render it unsafe for building purposes. I have found that by a very simple expedient I can electric weld the waste ends of two pipes so that the pipe or column will be stronger at the weld than at any other point and at the same time have a structure which is entirely suitable for use as a concrete filled column.

Reference is to be had to the accompanying drawings, in which

Fig. 1 is a side view of a column constructed in accordance with this invention;

Fig. 2 is a side view on an enlarged scale of a part of such a column showing the welded joint and adjacent parts, and partly in section to show the interior, and Fig. 3 is a sectional view of the joint on the line 3—3 of Fig. 2.

In order to utilize the waste ends which are often 6 or 8 feet in length, I take two of the waste ends 10 and abut them together. Inside I place a length 11 of a pipe of the next smaller size which just fits within the ends 10. This overlaps at both ends and forms a strengthening piece for them. This inner pipe 11 can be of any desired length but it should have a length sufficient to extend materially beyond the adjacent ends of the original pipes. I then weld the joint between the two pipes. This forms a circular weld 12 entirely around the structure. This weld extends in far enough so that it welds the pipe length 11 to both of the pipe ends. In other words, it extends clear through the external pipe ends 10.

This welding can be done electrically in such a neat manner that after the exterior is ground, the external ground surface is the only thing that indicates the presence of the weld. It can then be painted over or merely put out doors and left to rust and it will not show externally the fact that it has been welded. On account of placing the piece 11 inside fitting the interior of the pipe ends 10 all around and extending the weld 12 into its surface so as to weld it to both of the other pipes at that point I provide a joint which is not only as strong as the pipe ends 10 at any other point but is actually stronger. Although I have used up some of the space inside the pipe ends, this is a matter that does not interfere with the use of the device as a concrete filled column and it does not decrease the strength of the column in the least. I find that these columns welded in this way about at the center are even stronger than columns made of one piece of pipe and will pass all building inspection tests as well as standing all the strain which a column of that size is designed to resist.

In this way a great saving is provided and that is done with very little expense because the operation can be performed in a very short period of time and without any expensive apparatus that does not have to be employed anyway. I find that the cost of the welding at this point is about the same as the cost of a foot and a half of piping. Obviously therefore, the saving is substantially equal to the expense of the whole length of the column reduced by that much length.

Wherever I have mentioned pipe or piping it will be understood as a generic term including steel tubes as well as iron pipe.

Although I have illustrated and described only a single form of the invention and shown the welded pipe or tube as used only for a single purpose. I am aware of the fact that it is capable of being carried out with some modifications and being used for other purposes without departing from the scope of the invention as expressed in the claims. Therefore, I do not wish to be limited in these respects but what I do claim is:—

1. As an article of manufacture, a welded iron concrete filled column consisting of a plurality of pipe ends placed end to end in registration with each other and provided with an inner pipe of the same material fitting the inside of the pipe ends all around and located at the joint between them, the abutting ends of the pipe ends being welded together and the weld extending to the surface of the said inner pipe, whereby that is welded to both of the pipe ends.

2. The process of making a concrete column that consists in placing a pair of pipe ends together end to end, placing a piece of the next smaller size pipe within them at the joint and lapping over the joint at both ends, electric welding the two pipe ends together at the joint all around the circumference, extending said electric weld all the way through said pipes into contact with the surface of the inner pipe all around it, and then grinding off the exterior surface to make it flush with the adjacent surfaces of the original pipe ends.

In testimony whereof I have hereunto affixed my signature.

LE ROY BRAISTED.